MAGNETIC MEMORY MATRICES

Filed Oct. 14, 1963 3 Sheets-Sheet 1

Inventor
BY WILLIAM D. BOHANNON, JR.
W. M. Kain
ATTORNEY

Aug. 27, 1968 W. D. BOHANNON, JR 3,399,389

MAGNETIC MEMORY MATRICES

Filed Oct. 14, 1963 3 Sheets-Sheet 3

United States Patent Office 3,399,389
Patented Aug. 27, 1968

3,399,389

MAGNETIC MEMORY MATRICES

William D. Bohannon, Jr., Graham, N.C., assignor to Western Electric Company, Incorporated, New York, N.Y., a corporation of New York Filed Oct. 14, 1963, Ser. No. 316,165
18 Claims. (Cl. 340—174)

ABSTRACT OF THE DISCLOSURE

A magnetic memory matrix in the form of a woven fabric includes a plurality of paralled magnetizable conductive strands alternating with return wires and interspaced by first non-conductive fibers. A plurality of parallel word coils interspaced by second non-conductive fibers form loops around the magnetizable strands. The first and second nonconductive fibers are interwoven with the magnetizable strands and word coils such that the strands and word coils are maintained in predetermined relative positions.

This invention relates to magnetic memory matrices and more particularly to such matrices comprising twistors and associated controlling and sensing conductors woven into a fabric-like structure of memory cells.

In the manufacture of magnetic memory matrices in which twistors and associated controlling and sensing conductors form a pattern of memory cells, it is necessary that the controlling and sensing conductors be operatively associated with the twistors and also that the memory cells be properly spaced to prevent interaction of interference between cells. Further, it is frequently necessary to construct such matrices to minimal dimensions consistent with satisfactory performance. Economical manufacture of such matrices is, of course, of prime importance.

A number of expedients for manufacturing such matrices are known, among them plastic encapsulation techniques such as those outlined in Bohannon and Kaltenthaler, "Twistor Cable—A Case in Precision Laminating," Western Electric Engineer, July 1962, p. 35. Also, in A. H. Bobeck Patent 3,083,353, issued Mar. 26, 1963, the possibility of weaving twistors and sensing conductors is suggested. However, these expedients have left room for improvement in the construction of such memory matrices. Matrices constructed in accordance with this invention exhibit highly satisfactory or improved electrical characteristics. They may be constructed with existing apparatus to closer tolerances and with a marked reduction in dimensions to realize a new order of miniaturization. Furthermore, these matrices may be fabricated with existing apparatus at a cost well below that for manufacturing prior twistor matrices.

The term "twistor" as used herein encompasses the range of helically magnetized memory components disclosed in the above-identified patent and to analogous memory components having a generally elongated, strandlike configuration. This term includes the so-called "piggy back" twistor comprising a conductive core having more than one winding of magnetizable material thereon.

The term "word coil" as used herein encompasses the range of sensing and/or control conductors suitable for inductively coupling to one or more twistors to exercise the sensing and/or control function.

The term "memory cell" as used herein has reference to the intersection of a twistor and its associated sensing conductor. Such a cell is capable of retaining one bit of information. A word coil comprises a portion of one or more memory cells.

It is an object of this invention to provide a new and improved magnetic memory matrix.

A further object of this invention is the provision of a new and improved magnetic memory matrix capable of manufacture by means of fabric weaving techniques.

It is also an object of this invention to provide a new and improved magnetic memory matrix capable of being fabricated with substantial economies of time, effort, and expense.

It is a still further object of this invention to provide new and improved magnetic matrix, the memory cells of which have minimal dimensions and precise spacing therebetween.

With these and other objects in view, this invention contemplates a magnetic memory matrix including twistors and word coils for determining the condition of remanent magnetization of the twistors, combined by weaving into a fabric-like structure. In this structure, twistors interspaced by fibers comprise the woof. The word coils form a loop about one or more of the twistors and warp and woof fibers are interwoven to form a buffer zone, that is, a suitable separation for preventing interaction or interference between word coils. In this fabric-like structure, each word coil may loop about each twistor with which it forms a memory cell to provide a variable memory matrix. Alternatively, certain of the word coils may form loops about selected ones of the twistors to provide a pattern of permanent memory cells.

The foregoing and other objects and features of this invention will be understood from a consideration of the following detailed description read in conjunction with the accompanying drawings, in which.

Figures 1, 2:
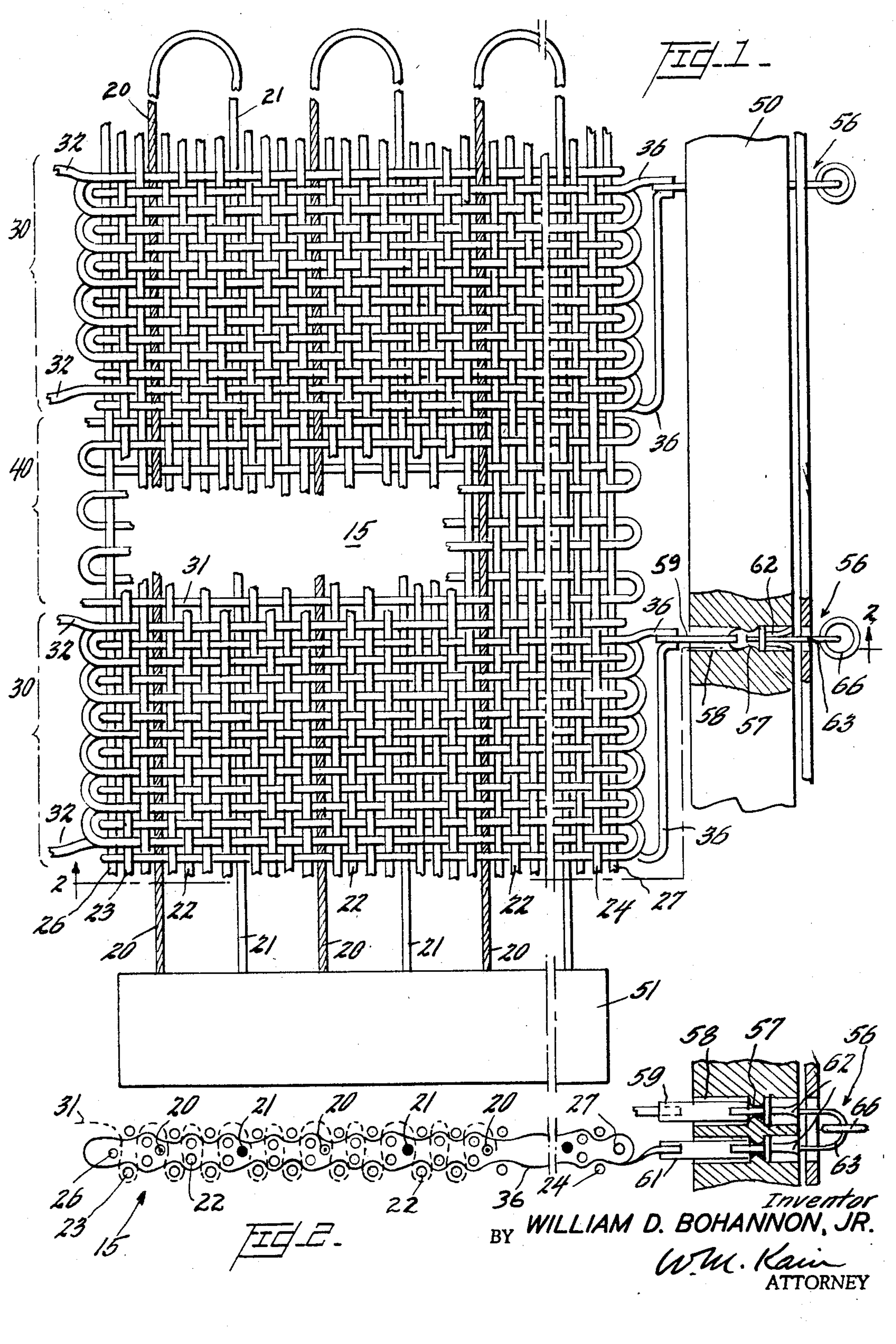
FIG. 1 is a plan view, partially broken away, of a variable magnetic memory matrix consisting of twistors, return wires, word and bias coils, and fibers, woven together in accordance with the principles of this invention.
FIG. 2 is a sectional view taken along line 2—2 of FIG. 1, showing the manner in which a word coil of the memory matrix is looped about the twistors and how the fibers are interwoven.

The memory matrix 15 shown in FIGS. 1 and 2 is a fabric-like structure in which a plurality of twistors 20 regularly spaced from their associated return wires 21 and interspaced by warp fibers 22 make up the body of the warp. Edge reinforcing fibers 23 and 24 and reinforcing wires 26 and 27 make up the edge portions of the warp. It will be seen that each twistor 20 extends vertically through the length of the matrix to interconnect with its return wire.

The woof of matrix 15 is made up of a plurality of word coils 30 interspaced by woof fibers 31. The woof also includes bias coils 32, the individual loops of which alternate with the individual loops of the conductors forming the word coils 30.

The woof, warp, and edge reinforcing fibers are preferably made of nylon or rayon. However, these fibers may be made of any suitably strong fiber, the material of which will not adversely affect the electrical properties of this type of magnetic memory matrix.

Each word coil and each bias coil is made up of a flat, ribbon-like conductor 36. As best seen in FIG. 2, the conductor 36 forms a complete loop about all of the twistors 20 and return wires 21 and is interwoven with warp fibers 22, edge reinforcing fibers 23 and 24, and reinforcing wires 26 and 27. As best seen in FIG. 1, conductor 36 makes seven complete loops about the twistor and return wires to form one word coil 30. Bias coils 32 are formed identically with the word coils, arranged, however, in the opposite sense to terminate on the opposite edge of matrix 15.

Woof fiber 31 is interwoven with warp fibers 22, edge reinforcing fibers 23 and 24, and reinforcing wires 26 and 27 to provide a buffer zone 40 which separates the individual word coils 30. This buffer zone is sufficiently wide to prevent interaction and interference between the memory cells formed by adjacent word coils.

It will be noted that the portions of matrix 15 in which word coils 30 comprise a part of the woof are of double fabric which encloses the twistor and return wires. Since the warp fibers and reinforcing fibers are interwoven with the word coils 32, the double fabric of the word coil portions of the matrix 15 is tightly locked together to enclose each twistor and return wire in a tube of fabric which prevents lateral shifting of these elements. The buffer zones 40 are single fabric in which the woof fibers 31 interweave all the warp strands. It follows that each memory cell of matrix 15, that is each portion of the matrix in which a word coil 30 intersects a twistor 20, is completely surrounded by tightly interwoven fabric. Thus, each memory cell is precisely spaced relative to each other memory cell so as to prevent interaction or interference between the cells.

In use, a plurality of matrices 15 in superposed relation are supported within a frame 50. The twistors and return wires are appropriately connected to Z coordinate write pulse and information utilization circuits 51. Each continuous conductor 36 comprising a word coil 30 is terminated by means of a connector 56 which joins the ends of the conductor 36 to form a complete closed loop. Each connector 56 is supported on an annular flange 57 formed within a bore 58 and includes a pair of lugs 59 and 61 to each of which is electrically connected a receptacle 62. A bail 63 is plugged into and interconnects receptacles 62. A toroidal core 66 links each of the bails 63 to provide a suitable means for interconnection with X and Y coordinate write and read pulse circuits in a conventional manner.

Matrix 15 is shown and described in connection with FIGS. 1 and 2, includes both twistors and return wires within the body of the matrix. If it were desired to prepare matrix 15 for connection to external circuitry in which both ends of twistor 20 are connected directly to Z coordinate circuitry, it would be unnecessary to include return wire within the body of the matrix. In such case, twistors 20 interspaced by warp fibers 22 would comprise the central portion of the warp of the matrix.

In certain applications, it may be desirable to replace the return wires 21 with twistors, the helical magnetization paths of which are formed in the reverse direction to that of twistors 20. Such a structure provides output pulses of noticeably higher energy than is the case with matrix 15. This structure may also be produced with word coils of reduced width spaced by buffer zones of reduced width.

Matrix 15 as shown and described includes bias coils 32, the individual loops of which alternate with the individual loops forming word coils 30. Clearly, if bias coils were not desired, the fabric of matrix 15 could be woven without employing the bias coil conductors as a part of the woof.

Figure 3:
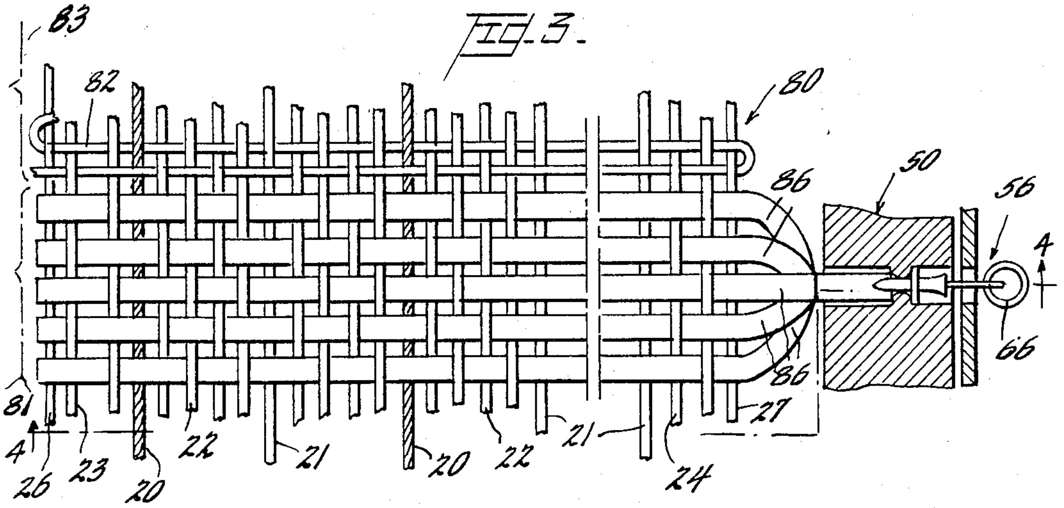
FIG. 3 is a fragmentary plan view of an alternative embodiment of a variable memory matrix constructed in accordance with this invention having a word coil structure varying from that shown in FIG. 1.
Figure 4:
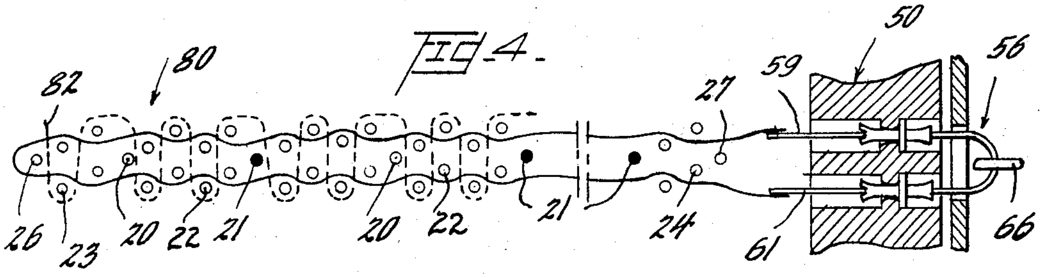
FIG. 4 is a sectional view of the matrix shown in FIG. 3, taken along line 4—4 thereof showing the manner in which each word coil is terminated.

The variable magnetic matrix generally designated 80 shown in FIGS. 3 and 4, is similar to matrix 15 excepting that the word coil structure is altered, no bias coils are included (although these might be included if desired), and the manner in which the warp fibers are interwoven with the word coils is altered.

The warp making up the fabric-like structure of matrix 80 is similar to that of matrix 15 and comprises twistors 20, return wires 21, warp fibers 22, edge reinforcing fibers 23 and 24, and reinforcing wires 26 and 27. The woof of matrix 80 is made up of word coils 81 interspaced by woof fibers 82 forming buffer zones 83 between the word coils.

Each word coil of matrix 80 is formed of a plurality of flat, ribbon-like conductors 86, each of which forms a complete loop about the twistors and return wires. Alternate conductors 86 are interwoven in the opposite sense with the warp fibers, edge reinforcing fibers, and reinforcing wires. The ends of each of conductors 86 forming a single word coil are connected to the lugs 59 and 61 of a connector 56. Connectors 56 are supported within frame 50 which supports a plurality of superposed matrices 80 in a manner similar to that discussed with reference to matrix 15. Likewise, twistors 20 and return wires 21 may be connected as desired to Z coordinate write pulse and information utilization circuits 51 and toroidal cores 66 connected to external X and Y coordinate circuitry as desired.

Figure 5:
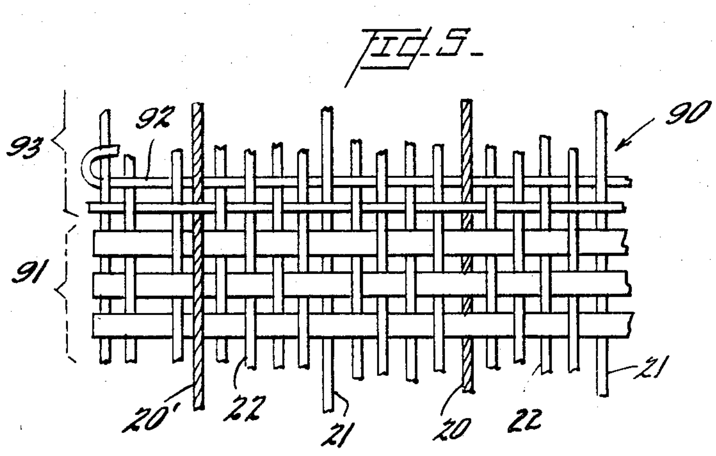
FIG. 5 is a fragmentary view of a permanent magnetic memory matrix showing two memory cells constructed in accordance with the principles of this invention.

Permanent magnetic memory matrix 90, illustrated in FIG. 5, is similar in structure to matrix 80 with the exception that the word coils 91 form loops around certain of the twistors and not about others of the twistors thereby creating a pattern of memory cells which are not inductively coupled (or only weakly coupled) to the external X and Y coordinate write and read pulse circuitry. It will be understood by those familiar with this art that those memory cells in which the word coils do not inductively couple (or only weakly couple) with the respective twistors will not respond when interrogated by the associated X and Y coordinate circuitry. Hence, such cells retain a permanent "0" condition. Similarly, in those memory cells in which the word coils do loop about the twistor, the cell may readily retain a "1" condition.

The warp of matrix 90 comprises twistors 20' and 20 alternating with return wires 21 interspaced by warp fibers 22 having edge reinforcing fibers and reinforcing wires which may be similar to, or identical with, those of matrix 80. Each word coil 91, however, forms a loop about certain twistors 20 and does not form a loop about certain other twistors 20'. Thus, memory cells formed by twistors 20' retain a permanent "0" condition while those associated with twistors 20 may be utilized to permanently retain a "1" condition. Woof fibers 92 are interwoven in the manner of woof fibers 82 to provide buffer zones 93 between the word coils.

Figure 6:
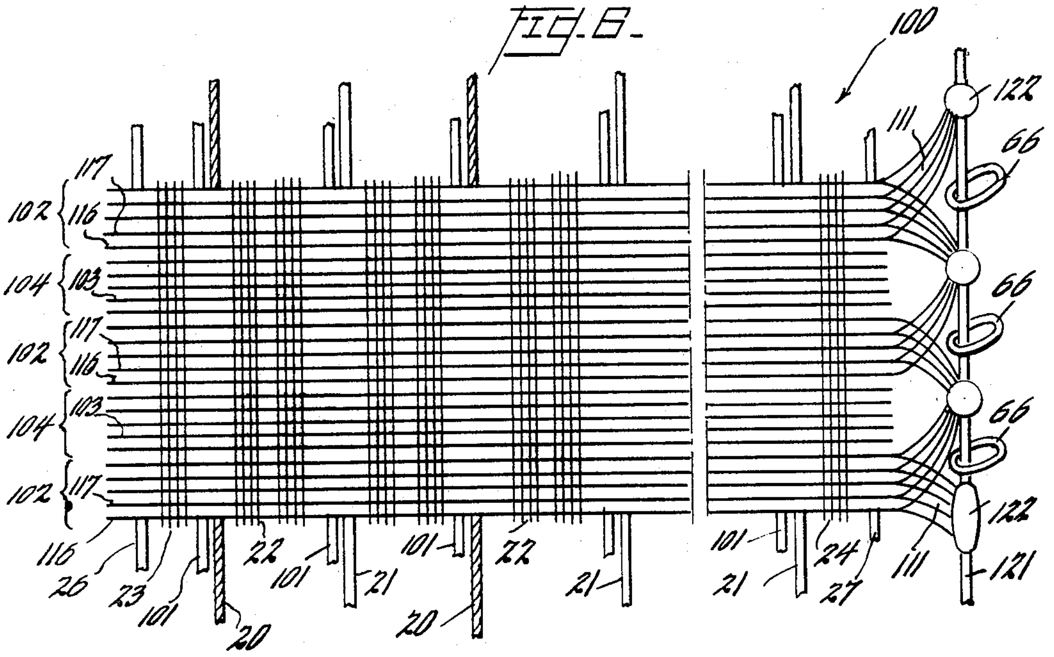
FIG. 6 is a schematic plan view, partially broken away, of another alternative embodiment of a memory matrix constructed in accordance with this invention, wherein the word coils consist of a plurality of wires formed in a spaced series of closed loops.
Figures 7, 8:
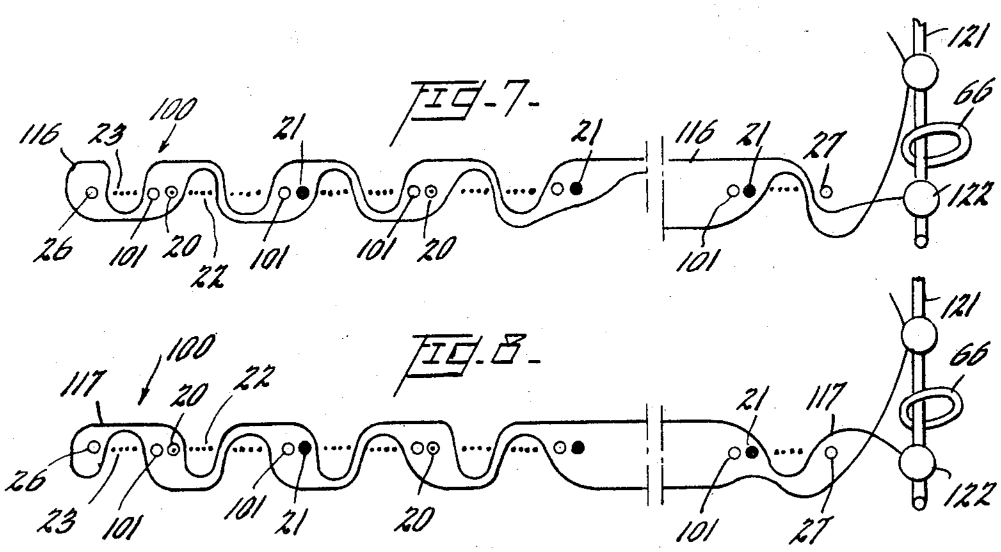
FIGS. 7 and 8 are schematic views of alternate wires in a word coil of the matrix shown in FIG. 6.

In the memory matrix 100 illustrated in FIGS. 6, 7, and 8, which also has a fabric-like structure, the warp is made up of twistors 20 alternating with return wires 21 interspaced by warp fibers 22. A mechanically strong reinforcing strand 101 made, for example, of nylon cord of a diameter greater than a twistor is laid beside each twistor and return wire wire. This matrix is also provided with edge reinforcing fibers 23 and 24 as well as reinforcing wires 26 and 27.

The woof of matrix 100 comprises word coils 102 interspaced by woof fibers 103 which form a portion of buffer zones 104 spacing alternate word coils.

Each of the word coils 102 of matrix 100 is made up of a plurality of wires 111 which form a spaced series of loops about the twistors and return wires. The path taken by each of the wires forming a portion of a word coil is illustrated in FIGS. 7 and 8. FIG. 7 shows the path of one such wire 116 making a complete loop including all of the twistors, return wires, and reinforcing strands, and interweaving the warp fibers 22, reinforcing fibers 23 and 24, and the reinforcing wires 26 and 27. FIG. 8 illustrates the path of the wire 117 which is the wire next adjacent to wire 116. It will be seen that wire 117 forms a loop about all of the twistors, return wires, and reinforcing strands in the same sense as does wire 116. However, wire 117 is interwoven with the other warp strands in opposite sense to that of wire 116.

As best seen in FIG. 6, the wires forming word coils 102 are continuous. Thus, wires 116 and 117 form a portion of each of the illustrated word coils.

Reinforcing strands 101 serve a manifold purpose. As is known, elongation or crushing of a twistor may have deleterious effects on its electrical and magnetic properties. Since strands 101 are placed beside the twistors in the warp of matrix 100, they protect the twistors from tensile forces tending to elongate the twistors and other forces tending to crush the twistors. Reinforcing strands 101 serve this purpose during the weaving of matrix 100. Being tightly bound together with the twistors by woof strands, the reinforcing strands also serve this purpose for the matrix 100 in use.

Twistors 20 and return wires 21 of matrix 100 may be coupled to appropriate Z coordinate circuitry. However, X and Y coordinate write and read pulse circuits are coupled to matrix 100 by means of a terminating structure including a bus 121 which is electrically connected to both ends of each of the word coils by means of solder connections 122 to form a closed loop of each of the word coils. Each of the word coils so formed is coupled to appropriate X and Y coordinate write and read pulse circuits in a conventional manner as by means of a toroidal core 66 which surrounds each portion of bus 121 completing the loop of each respective word coil.

A plurality of matrices 100 may be superposed in a frame similar to frame 50 modified to accommodate the modified terminating structure including bus 121.

Each of the matrices above discussed, 15, 180, 90, and 100, may readily be fabricated by employing a hand loom in which the twistors, return wires, and other strands comprising the warp is strung in the loom as warp and the word coils, bias coils, and woof fibers are woven in the patterns discussed with a simple hand shuttle. However, one of the principal advantages of the above discussed matrices is that each may be readily constructed using modern automatic fabric weaving machines and techniques. The connectors 56, and the special termination including bus 121 (matrix 100) may be appropriately connected to these matrices after they have been woven. Similarly, external X, Y, and Z coordinate write and read and information utilization circuits may subsequently be connected as discussed above in accordance with the intended use of the particular matrix.

It is particularly noteworthy that the buffer zones and woven fiber spacing which surround the memory cells of these matrices may be woven with modern automatic weaving machines to very precise and uniform dimensions. Further, these machines are capable of fabricating the matrices of this invention with a high degree of miniaturization as compared with prior art fabricating machines and techniques.

It is to be understood that the above-described arrangements are simply illustrative of the application of the principles of this invention. Numerous other arrangements may be readily devised by those skilled in the art which will embody the principles of the invention and fall within the spirit and scope thereof. For example, each of the matrices 15, 80, and 100 may be woven to include one or more memory cells formed by a twistor and a word coil to which the word coil is not (or only weakly) coupled. Thus, these matrices might be woven to include permanent memory cells of the sort included in matrix 90. As another example, reinforcing strands comparable in structure and function to reinforcing strands 101 (FIG. 6) may be included in any of these matrices where desired.

It is clearly within the contemplation of this invention to exchange the positions of the warp and woof strands forming the magnetic matrices. Thus, the twistors and return wires might be combined woofwise with a warp comprising word coils. A particularly desirable embodiment of this invention is one similar to matrix 100 in which twistors forming complete loops with a bus such as bus 121 comprise the woof and word coils comprise the warp.

What is claimed is:

1. A magnetic memory matrix including twistors and word coils for determining the particular condition of remanent magnetization of the twistors, said matrix comprising a fabric in which
twistors interspaced by fibers comprise the warp, and
word coils interspaced by fibers comprise the woof, said word coils form a loop about one or more of said twistors, and the warp and woof fibers are interwoven to provide a buffer zone between adjacent word coils.

2. A memory matrix according to claim 1 wherein the warp fibers uniformly space the twistors and are interwoven with the word coils.

3. A memory matrix according to claim 1 wherein a reinforcing strand of a diameter slightly greater than the twistors is laid warpwise, parallel to, and immediately adjacent to each twistor.

4. A magnetic memory matrix including twistors and word coils for determining the particular condition of remanent magnetization of the twistors, said matrix comprising a fabric in which
twistors alternating with return wire interspaced by fibers comprise the warp, and
word coils interpsaced by fibers comprise the woof, said word coils form a loop about one or more of said twistors, and the warp and woof fibers are interwoven to provide a buffer zone between the word coils.

5. A memory matrix according to claim 4 wherein the warp fibers uniformly space each twistor relative to the next adjacent return wire and are interwoven with the word coils.

6. A magnetic memory matrix including twistors and word coils for determining the particular condition of remanent magnetization of the twistors, said matrix comprising a fabric in which
twistors interspace by fibers comprise the warp, and
word coils interspaced by fibers comprise the woof, word coils form a loop which encloses certain of the twistors while excluding other twistors to provide a predetermined pattern permanent memory cells, and the warp and woof fibers are interwoven to provide a buffer zone between the word coils.

7. A permanent magnetic memory matrix including intersecting twistors and word coils, each twistor-word coil intersection defining a memory cell, said matrix comprising a fabric in which
twistors alternating with return wires interspaced by fibers comprise the warp, and
word coils interspaced by fibers comprise the woof, said word coils form a loop which encloses certain of the twistors while excluding other twistors to define a pattern of permanent memory cells, and the warp fibers are interwoven with the woof fibers and the word coils to isolate each memory cell from each other memory cell.

8. A magnetic memory matrix including twistors and word coils for determining the particular condition of remanent magnetization of the twistors, said matrix comprising a fabric in which
twistors interspaced by fibers comprise the warp, and
a plurality of wires and fibers comprise the woof, said wires are looped about said twistors to define a series of interconnected word coils and the warp and woof fibers are interwoven to provide a buffer zone between each word coil.

9. A magnetic memory matrix according to claim 8 wherein each word coil is provided with a termination at either end thereof and the terminations are shorted together to provide a pattern of closed inductive loops about the twistors.

10. A magnetic memory matrix according to claim 8 wherein the warp fibers and the individual wires are interwoven to define a pattern of mutually isolated memory cells.

11. A magnetic memory matrix including twistors and sensing conductors for determining the particular condition of remanent magnetization of the twistors, said matrix comprising a fabric in which spaced twistors and fibers comprise the warp, and sensing conductors interspaced by fibers comprise the woof, the warp and woof fibers are interwoven to provide a buffer zone between adjacent word coils, and the warp fibers and sensing conductors are interwoven to retain the twistors in spaced relationship.

12. A magnetic memory matrix comprising a plurality of parallel twistors spaced within a single plane, a plurality of parallel return wires connected to and interspaced between the twistors and lying in said plane, a plurality of first groups of warp fibers, each group of which is interposed between each twistor and return wire, a plurality of second groups of warp fibers each group of which is interposed between each twistor and return wire, and a plurality of parallel sensing conductors transversely looped around the twistors and return wires and interwoven with the warp fibers of the first groups and then the fibers of the second groups to provide a double fabric which encases the twistor and return wires.

13. A magnetic memory matrix in the form of a woven fabric comprising:

a plurality of parallel magnetizable conductive strands capable of assuming stable states of remanence;

a first plurality of non-conductive fibers interspaced between the magnetizable strands;

a plurality of parallel control conductors arranged so that the control conductors cross the magnetizable strands; and a second plurality of non-conductive fibers interspaced between the control conductors and interwoven with the first fibers and the magnetizable strands such that the individual control conductors and magnetizable strands are maintained in predetermined relative positions.

14. A magnetic memory matrix in the form of a woven fabric comprising:

a plurality of parallel magnetizable conductive strands capable of assuming stable states of remanence;

a plurality of parallel control conductors, each of which forms a loop around one or more of the magnetizable strands; and a plurality of non-conductive fibers interwoven with the control conductors and magnetizable strands such that the individual control conductors and magnetizable strands are maintained in predetermined relative positions.

15. A magnetic memory matrix as defined in claim 14 wherein the plurality of non-conductive fibers comprise:

a first plurality of non-conductive fibers interspaced between the magnetizable strands; and a second plurality of non-conductive fibers interspaced between the control conductors, said first and second fibers being interwoven with the control conductors such that the magnetizable strands are enclosed between two layers of interwoven control conductors and first and second fibers.

16. A magnetic memory matrix as defined in claim 14 wherein a reinforcing strand of a diameter slightly greater than each of the magnetizable strands is parallel to and immediately adjacent to each of the magnetizable strands.

17. A magnetic memory matrix in the form of a woven fabric comprising:

a plurality of parallel magnetizable conductve strands capable of assuming stable states of remanence;

a plurality of parallel control conductors at least one of which forms a loop around certain of the magnetizable strands and not around other magnetizable strands; and a plurality of non-conductive fibers interwoven with the control conductors and magnetizable strands such that the control conductors and magnetizable strands are maintained in a predetermined spaced relationship.

18. A magnetic memory matrix in the form of a woven fabric comprising:

a plurality of parallel magnetizable conductive strands capable of assuming stable states of remanence;

a plurality of reinforcing strands having diameters slightly greater than the magnetizable strands, each reinforcing strand being parallel and immediately adjacent to a magnetizable strand;

a plurality of parallel control conductors arranged so that the control conductors cross the magnetizable strands; and a plurality of non-conductive fibers interwoven with the control conductors, magnetizable strands, and reinforcing strands such that the individual conductors and strands are maintained in predetermined relative positions.

References Cited

UNITED STATES PATENTS

| | | | |
|---|---|---|---|
| 1,697,142 | 1/1929 | Roller | 139—425 X |
| 2,327,756 | 8/1943 | Adamson | 219—46 |
| 3,083,353 | 3/1963 | Bobeck | 340—174 |
| 3,105,962 | 10/1963 | Bobeck | 340—174 |
| 3,163,855 | 12/1964 | Bobeck | 340—174 |
| 3,221,312 | 11/1965 | MacLachlan | 340—174 |

FOREIGN PATENTS

| | | |
|---|---|---|
| 842,050 | 6/1939 | France. |

BERNARD KONICK, *Primary Examiner.*

JAMES W. MOFFITT, *Assistant Examiner.*